(12) United States Patent
Zelechonok

(10) Patent No.: US 12,332,222 B1
(45) Date of Patent: *Jun. 17, 2025

(54) LIQUID CHROMATOGRAPHY METHOD FOR COMPOUNDS HAVING A SULFATE GROUP

(71) Applicant: Yury Zelechonok, Northbrook, IL (US)

(72) Inventor: Yury Zelechonok, Northbrook, IL (US)

(73) Assignee: SIELC Technologies Corporation, Wheeling, IL (US)

( * ) Notice: Subject to any disclaimer, the term of this patent is extended or adjusted under 35 U.S.C. 154(b) by 631 days.

This patent is subject to a terminal disclaimer.

(21) Appl. No.: 17/555,470

(22) Filed: Dec. 19, 2021

(51) Int. Cl.
| | | |
|---|---|---|
| *G01N 30/34* | (2006.01) | |
| *B01D 15/08* | (2006.01) | |
| *B01D 15/36* | (2006.01) | |
| *B01D 15/38* | (2006.01) | |
| *G01N 30/02* | (2006.01) | |
| *G01N 30/88* | (2006.01) | |

(52) U.S. Cl.
CPC ............. *G01N 30/34* (2013.01); *B01D 15/08* (2013.01); *B01D 15/36* (2013.01); *B01D 15/38* (2013.01); *G01N 30/88* (2013.01); *G01N 2030/027* (2013.01)

(58) Field of Classification Search
None
See application file for complete search history.

(56) References Cited

U.S. PATENT DOCUMENTS

| 7,947,507 B2 | 5/2011 | Venkataraman et al. | |
|---|---|---|---|
| 2019/0126241 A1* | 5/2019 | Lauber | B01J 20/287 |

FOREIGN PATENT DOCUMENTS

CN 102323355 A 1/2012

OTHER PUBLICATIONS

Karcher et al.The Use of Complexing Eluents for the High Performance Liquid Chromatographic Determination of Metal Species. (Year: 1991).*
Karcher et al. "Chapter 6 The Use of Complexing Eluents for the High Performance Liquid Chromatographic Determination of Metal Species" (Year: 1991).*
The Royal Society of Chemistry "Supplementary Material (ESI) for Chemical Communications" (Year: 2008).*
Doneanu et al. "Impurity Evaluation of Heparin Sodium by Anion Exchange Chromatography" (Year: 2009).*
Lucy, Charles A., and Sarah Pelletier. "Advances in fast ion chromatography." European Pharmaceutical Review. Mar. 24, 2006. Internet URL: https://www.europeanpharmaceuticalreview.com/article/2835/advances-in-fast-ion-chromatography/. Retrieved Dec. 11, 2021.
Doneanu, Catalin E., and Weibin Chen. "Impurity Evaluation of Heparin Sodium by Anion Exchange Chromatography." American Laboratory. Oct. 1, 2009. Internet URL: https://www.sigmaaldrich.com/US/en/technical-documents/protocol/analytical-chemistry/large-molecule-hplc/hplcanalysis-of-lmw-heparin-dalteparin-and-enoxaparin-analysis. Retrieved Dec. 11, 2021.

(Continued)

*Primary Examiner* — Krishnan S Menon
(74) *Attorney, Agent, or Firm* — John C. Shepard

(57) ABSTRACT

A method for analyzing compounds having a sulfate group using liquid chromatography separation employs a cation-exchange column and a mobile phase with a high concentration of organic components including positively charged cations lacking more than one electron.

9 Claims, 4 Drawing Sheets

(56) References Cited

OTHER PUBLICATIONS

"Heparain (2) (SB-806M HQ)." Showdex. Showa Denko K.K. Internet URL: https://www.shodex.com/en/dc/03/06/18.html. Retrieved Dec. 11, 2021.

"HPLC Analysis of LMW Heparin-Dalteparin and Enoxaprin Analysis on Zenix®-100." MilliporeSigma. Merck KGaA. Internet URL: https://www.sigmaaldrich.com/US/en/technical-documents/protocol/analytical-chemistry/large-molecule-hplc/hplc-analysis-of-lmw-heparin-dalteparin-and-enoxaparin-analysis. Retrieved Dec. 11, 2021.

* cited by examiner wherein
  n is a number > 1
  R1,R2,R3,R4 are hydrogen
    or alkyl groups

| | |
|---|---|
| Column: | Primesep S2 |
| Column size: | 4.6 × 150 mm, 5 μm |
| Mobile phase: | A: 60% MeCN with 10 mM N,N'-Dimethylpiperazine pH 4.0 with AcOH |
| | B: 10% MeCN with 10 mM N,N'-Dimethylpiperazine pH 4.0 with AcOH |
| Gradient: | 100% A for 5 min then 100% B for 7 min |
| Flow rate: | 1.0 mL/min |
| Detection: | ELSD, temperature 70° C |

1. Sodium
2. Enoxaparin (a) Tetramethylethylene-1,2-diamine
(b) Propylene-1,3-diamine
(c) Diethylenetriamine
(d) Ethylenediamine
(e) N,N'-Dimethylpiperazine
(f) N,N,N',N', Tetramethylpropylene-1,3-diamine

LIQUID CHROMATOGRAPHY METHOD FOR COMPOUNDS HAVING A SULFATE GROUP

BACKGROUND OF THE INVENTION

Technical Field

The present invention relates to a liquid chromatography method for analyzing sulfated carbohydrates, such as heparin and, more particularly, to a liquid chromatography method which is not based on an ion-exchange mechanism of ion separation.

Background Art

Typically, liquid chromatography employs a mobile phase ("MP") and a stationary phase contained within a column. A sample to be analyzed is injected into a mobile phase flow and the stationary phase separates or retains sample components prior to the mobile phase passing through a detector.

Liquid chromatography ("LC") is a powerful tool in the separation of ionic and neutral compounds. In LC, a sample is separated into its various components that can be subsequently analyzed by a detector. Four main types of chromatography are responsible for the majority of small molecule separations, namely. normal phase ("NP"), reverse phase ("RP"), ion-exclusion, and ion-exchange chromatography ("IEC"). Typically, each mode of separation requires a specifically tailored stationary phase.

Particularly for separation of ions, special ion-exchange columns were developed and are now widely used in analytical and preparative scales of separation.

Cation-exchange columns are used for separation of cations and for that they are constructed to have a negatively charged surface of the stationary phase. Anion-exchange columns are used for separation of anions and for that they are constructed to have a positively charged surface of the stationary phase.

It is also possible to separate ions of the same charge as the stationary phase surface in so-called ion-exclusion mode of chromatography, but this mode of separation has limited application due to a very narrow separation window.

In IEC, the analytes have an affinity to the stationary phase due to strong electrostatic interaction. Thus, positively charged analytes are strongly retained on negatively charged IEC columns and negatively charged analytes are strongly retained on positively charged IEC columns. Degree of affinity of the charged analyte to the oppositely charged column surface depends on a number of charges the particular analyte ion has, on the geometry of the particular ion, on the structure of the solvation layer formed by water around the ion, and on various other factors. This degree of affinity is a basis for separation of multiply ions on the same column during one separation cycle.

In order to facilitate an ion-exchange process, an aqueous mobile phase (MP) is typically used with additives capable of generating ions while dissolved in water. Those ions compete with analytes for the surface of the stationary phase, thereby creating the ion-exchange process. Typical additives are water soluble salts, acids, bases and ionic buffers.

A typical example of such separation is in the analysis of the mixture of basic cations $Li^+$, $Na^+$, $K^+$, $NH_4^+$ or separation of acidic anions $Cl^-$, $I^-$, $Br^-$, $NO_3^-$. C. A. Lucy and S. Pelletier, "Advances in fast ion chromatography," *European Pharmaceutical Review*, March 2006.

Many organic molecules of medical, pharmaceutical, and industrial, environmental interest can exist in an ionic form at specific pH. Examples of such molecules are amino acids, DNA, proteins and peptides, neurotransmitters, many drugs, carboxylic acids, vitamins, surfactants, herbicides, etc. Although IEC is well established, any new process of separation of the ions has an importance in expanding the tools of their measurement and purification Heparin molecules and related medications Dalteparin and Enoxaparin are polymers with a molecular weight up to 30 kDa with multiple sulfate groups attached to the sugar polymer chain. The heparin and similar molecules have multiply negatively charged functional groups and are very hydrophilic. They are common blood medications.

However, there is not a good chromatography method to measure purity and quantitate the amount of heparin type of molecules in the drug formulations and other mixtures. One method described by W. Chen, in "Impurity Evaluation of Heparin Sodium by Anion Exchange Chromatography," *American Laboratory*, October 2009, relies on IEC and requires Spherisorb SAX 4.0×250 mm column with a mobile phase gradient comprising eluent A which is 50 mM $NaH2PO4$, and eluent B which is 2 M $NaClO4$ in 50 mM $NaH2PO4$. The mobile phase pH was adjusted to 2.5 with phosphoric acid.

Another known method requires two OHpak SB-806M HQ 8.0 mm I.D.×300 mm columns serially connected with a mobile phase of aqueous 0.1M NaCl.

Another known method uses Zenix SEC-100, 30 cm×7.8 mm I.D., 3 μm particles column with a mobile phase of aqueous 2.84%, pH 5 Sodium sulfate solution.

All these methods require very high salt concentration up to 2M, and are not compatible with mass spectrometer ("MS"), evaporative light scattering ("ELSD"), or charged aerosol ("CAD") detectors. However, heparin type molecules have a very low ultraviolet ("UV") response and detectors different from UV detectors are a preferred means of detection. In the case of ion exclusion chromatography, it also requires a long, large diameter column up to 600 mm. These long columns need to be operated with a long method and require a long equilibration time. Such columns are more expensive to produce and purchase than shorter 50 mm columns.

Other methods of analysis are described in the prior art, such as enzymatic digestion described in Chinese Patent No. CN102323355A or capillary electrophoresis described in Venkataraman et al. U.S. Pat. No. 7,947,507. The former is not an HPLC method and cannot be used without specialized CE equipment and the second method deals with digested heparin and cannot be used for intact heparin analysis.

BRIEF SUMMARY OF THE INVENTION

The present invention is directed to overcoming the problems as set forth above.

A primary object of the present invention is to make chromatographic conditions where sulfated hydrocarbons, such as heparin, and related compounds can be analyzed using conventional HPLC equipment.

Another object of the present invention is to use a mobile phase which is compatible with MS and other evaporative detectors that are more sensitive to sulfated hydrocarbons, such as heparin, than UV detectors.

Still another object of the present invention is to provide a method using a mobile phase which requires small buffer concentration.

Still another object of the present invention is to provide a method which uses shorter columns and can be completed more quickly than prior methods.

In an exemplary embodiment, a cation exchange column with a negatively charged stationary phase is used. The mobile phase used includes a miscible organic modifier and a multiply charged ionic modifier with the general structure:

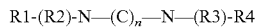

where n>1, and R1, R2, R3, R4 are independently selected from the group consisting of hydrogen and alkyl substitutes.

In one exemplary setting where heparin is analyzed, the mobile phase uses a high organic concentration of acetonitrile (MeCN, methyl cyanide) mixed with a doubly charged ionic modifier, such as N,N'-dimethylpiperazine, with pH adjusted to 4.0 by acetic acid. This setting provides good retention of heparin, narrow peak, low buffer concentration in the mobile phase, volatile mobile phase property that makes it compatible with MS and other evaporative detectors, and provides faster analysis on a short column.

In another exemplary setting, methanol (MeOH) is used as an organic modifier of the mobile phase.

BRIEF DESCRIPTION OF THE FIGURES

The details of construction and operation of the invention are more fully described with reference to the accompanying drawings which form a part hereof.

In the drawings.

All figures are drawn for ease of explanation of the basic teachings of the present invention only. The extensions of the figures will be explained or will be within the skill of the art after the following teachings of the present invention have been read and understood.

DETAILED DESCRIPTION OF THE PREFERRED EMBODIMENTS

This invention generally relates to high pressure liquid chromatography ("HPLC") and to ultra high pressure liquid chromatography ("UHPLC"), and more specifically to ion chromatography, but is not limited thereto and may be employed in other fields as well.

The liquid chromatography method disclosed herein uses a stationary phase in the cation-exchange column and a volatile mobile phase with an organic modifier and multiply charged cations to produce chromatographic separations that can be readily detected and measured.

Components of the mobile phase carrying the sample include the following: a solvent, such as water; an organic modifier, such as acetonitrile ("MeCN"), methanol ("MeOH"), tetrahydrofuran ("THF"), ethanol ("EtOH"), or isopropanol ("IPA"); multiply charged cations, such as the those set forth below; and if needed, a pH adjuster, such as acetic acid ("AcOH").

The disclosed method can be briefly described as the retention of ions of the same charge as the column surface by the use of multiply charged cations in the mobile phase.

While the disclosed chromatography method can be used to analyze a variety of compounds, it is most suitable for analyzing a group of compounds collectively described herein as sulfated carbohydrates. These include sugar polysulfates, polysugars having a polyaminosugar backbone with attached sulfate groups, pentosan polysulfate, glycosaminoglycan polysulfate, mucoitin sulfate, chondroitin sulfate, carrageenan, heparin, and Enoxaparin.

Figure 1:
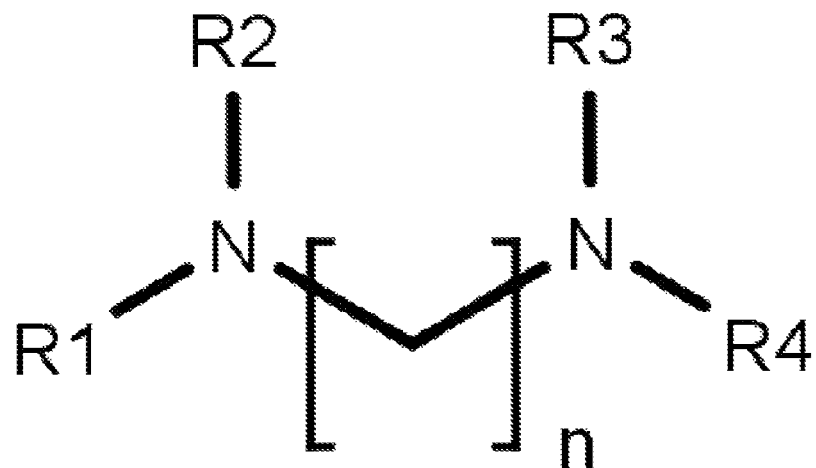
FIG. 1 shows the general structural formula of a molecule having two ionizable amino groups separated from each other by more than one carbon atom.

In one setting, the mobile phase includes a cation having the general structure:

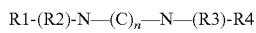

wherein n>1, and R1, R2, R3, R4 are independently selected from the group consisting of hydrogen and alkyl substitutes. The structural formula of this modifier is shown in FIG. 1.

Figure 2:
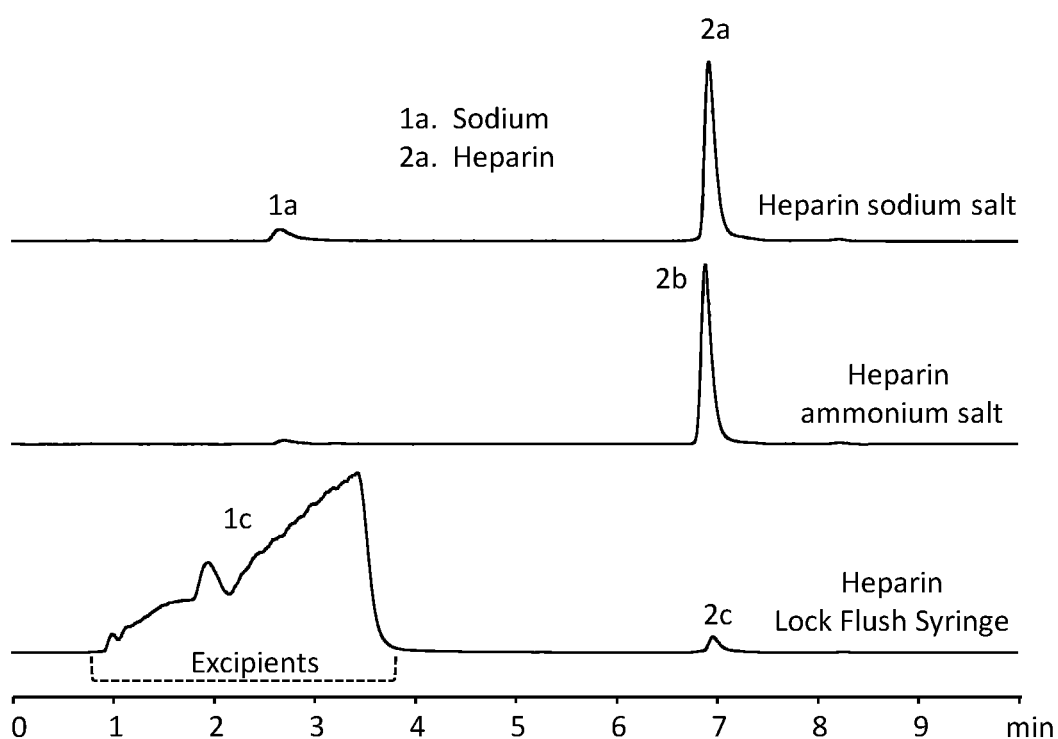
FIG. 2 shows a chromatogram example of heparin separation on a cation exchange column with N,N'-dimethylpiperazine as a component of the mobile phase.
Figure 3:
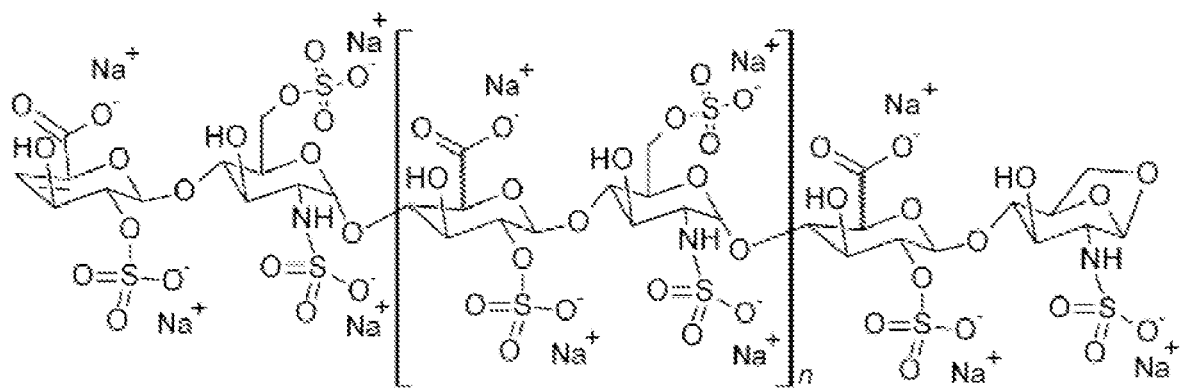
FIG. 3 shows the structural formula for Enoxaparin and a chromatogram example of its separation on a cation exchange column with N,N'-dimethylpiperazine as a component of the mobile phase; and, FIG. 4 shows formulas for various multiply charged cations usable in chromatographically analyzing sugar polysulfates.
Figure 3:
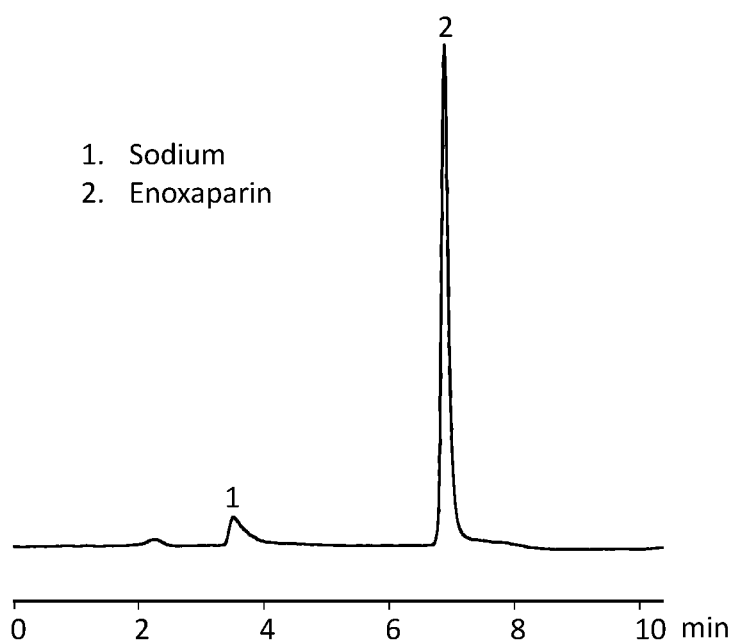

In FIGS. 2 and 3, example chromatography methods are set forth with the resulting chromatograms. The chromatograms taken over real time (minutes) show raised peaks indicating detectable sample components, which are measured in mV that is an analog detector output.

One example of the results of the chromatographic method disclosed herein is shown in the chromatogram of FIG. 2. In the method illustrated, acetonitrile is used as the mobile phase and the doubly charged cation, N,N'-dimethylpiperazine, is used as a doubly charged modifier with pH adjusted to 4.0 using acetic acid.

In the chromatogram, the upper line shows the results of analyzing a sample of heparin sodium salt with peak 1a indicating the presence of sodium and peak 2a indicating the presence of heparin. The middle line shows the results of analyzing a sample of heparin ammonium salt with peak 2b indicating the presence of heparin. The lower line shows the results of a sample found in a medicinal Heparin Lock Flush syringe with area 1c indicating the presence of excipients and peak 2c indicating the presence of heparin. Excipients are inactive substances found in the sample that are being separated with the heparin.

Another example of the results of a similar separation is shown in the chromatogram of FIG. 3. In the chromatogram, the line shows the results of a sample of Enoxaparin sodium salt with peak 1 indicating the presence of sodium and peak 2 indicating the presence of Enoxaparin.

Electrostatic interaction of ions with a charged stationary phase of the IEC column requires an opposite charge of the analyte and the column surface. According to this invention, it is not an absolute requirement. For example, retention of negatively charged analytes can be achieved on a negatively charged surface column as long as the mobile phase comprises an ionic doubly positively charged component. Suitable liquid mobile phases include MeCN and MeOH. The cations shown in FIG. 4 as well as other suitable multiply charged cations can also be used herein.

An example of a doubly positively charged component is N,N'-dimethylpiperazine in a concentration of 1% or less by weight to obtain the chromatograms shown in FIGS. 2 and 3.

Another example of a doubly positively charged component can be a diluted ethylenediamine or one of its analogs in a concentration of 1% or less by weight. Derivatives of ethylenediamine can be N, N,N'N'-tetramethylethylendiamine or propylenediamine or any other molecules with two or more basic groups.

Figure 4:
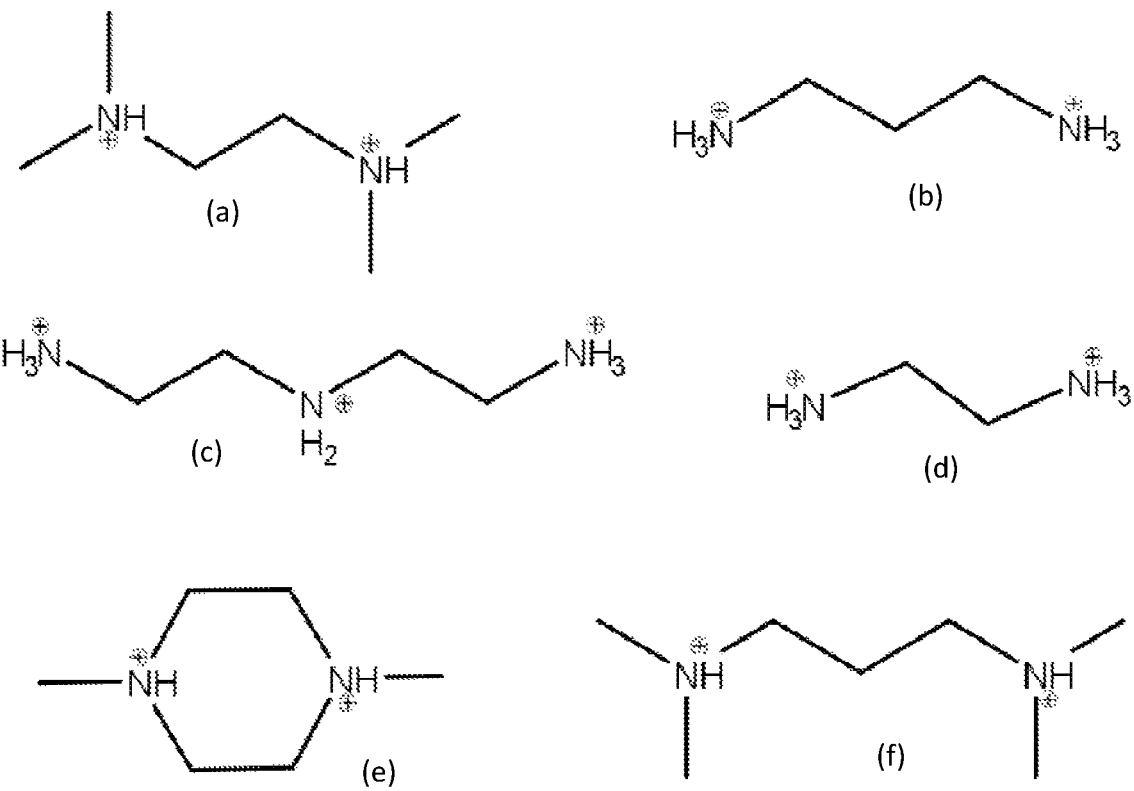

FIG. 4 shows the formulas of some of the multiply charged cations that may be employed in the chromatography analysis disclosed herein. In FIGS. 4(a)-4(f), structural formulas are shown for doubly charged cations tetramethylethylene-1,2-diamine, propylene-1,3-diamine, diethylenetriamine, ethylenediamine, N,N'-dimethylpiperazine, and N,N,N',N'-tetramethylpropylene-1,3-diamine.

INDUSTRIAL APPLICABILITY

Other aspects, objects and advantages of this invention can be obtained from a study of the drawings, the above disclosure and the appended claims.

While the present invention is susceptible of embodiment in many different variations of presented conditions, there are shown in the figure and will be described herein in detail specific setting thereof with the understanding that the present disclosure is to be considered as an exemplification of the principles of the invention and is not intended to limit the invention to the specific embodiments illustrated.

What is claimed is:

1. A method for separating compounds having a sulfate group using liquid chromatography employing a cation-exchange column and a mobile phase, the method comprising:
   providing a mobile phase with an organic modifier and positively charged cations lacking more than one electron;
   introducing into the mobile phase a sample containing the compounds having the sulfate group; and,
   passing the mobile phase with the sample through the cation-exchange column containing a negatively charged stationary phase to separate out the compounds having a sulfate group.

2. The method of claim 1 wherein the positively charged cations are alkyl diamines.

3. The method of claim 1 wherein the positively charged cations are alkyl diamines with the general structure

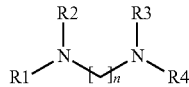

wherein n is a number >1 and R1, R2, R3, and R4 are independently selected from the group consisting of hydrogen and alkyl substitutes.

4. The method of claim 1 wherein the positively charged cations within the mobile phase have a concentration less than one percent by weight.

5. The method of claim 1 wherein the positively charged cations are selected from the group consisting of tetramethylethylene-1,2-diamine, propylene-1,3-diamine, diethylenetriamine, ethylenediamine, N,N'-dimethylpiperazine, and N,N,N',N'-tetramethylpropylene-1,3-diamine.

6. The method of claim 1 wherein the organic modifier is selected from the group consisting of acetonitrile, methanol, tetrahydrofuran, ethanol, and isopropanol.

7. The method of claim 6 wherein the organic modifier is acetonitrile.

8. The method of claim 6 wherein the organic modifier is methanol.

9. A method for separating compounds having a sulfate group using liquid chromatography employing a cation-exchange column and a mobile phase, the method comprising:
   providing a mobile phase with an organic modifier and doubly charged alkyl diamine cations with the general structure

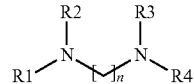

wherein n is a number >1 and R1, R2, R3, and R4 are independently selected from the group consisting of hydrogen and alkyl substitutes, and wherein the doubly charged alkyl diamine cations within the mobile phase have a concentration less than one percent by weight;
   introducing into the mobile phase a sample containing the compounds having the sulfate group; and,
   passing the mobile phase with the sample through the cation-exchange column containing a negatively charged stationary phase to separate out the compounds having a sulfate group.

* * * * *